June 24, 1969 P. M. TOMARO, JR Re. 26,616
TORQUE ACTUATED REVERSIBLE GEAR REDUCTION ASSEMBLY
Original Filed June 22, 1962 Sheet 1 of 3
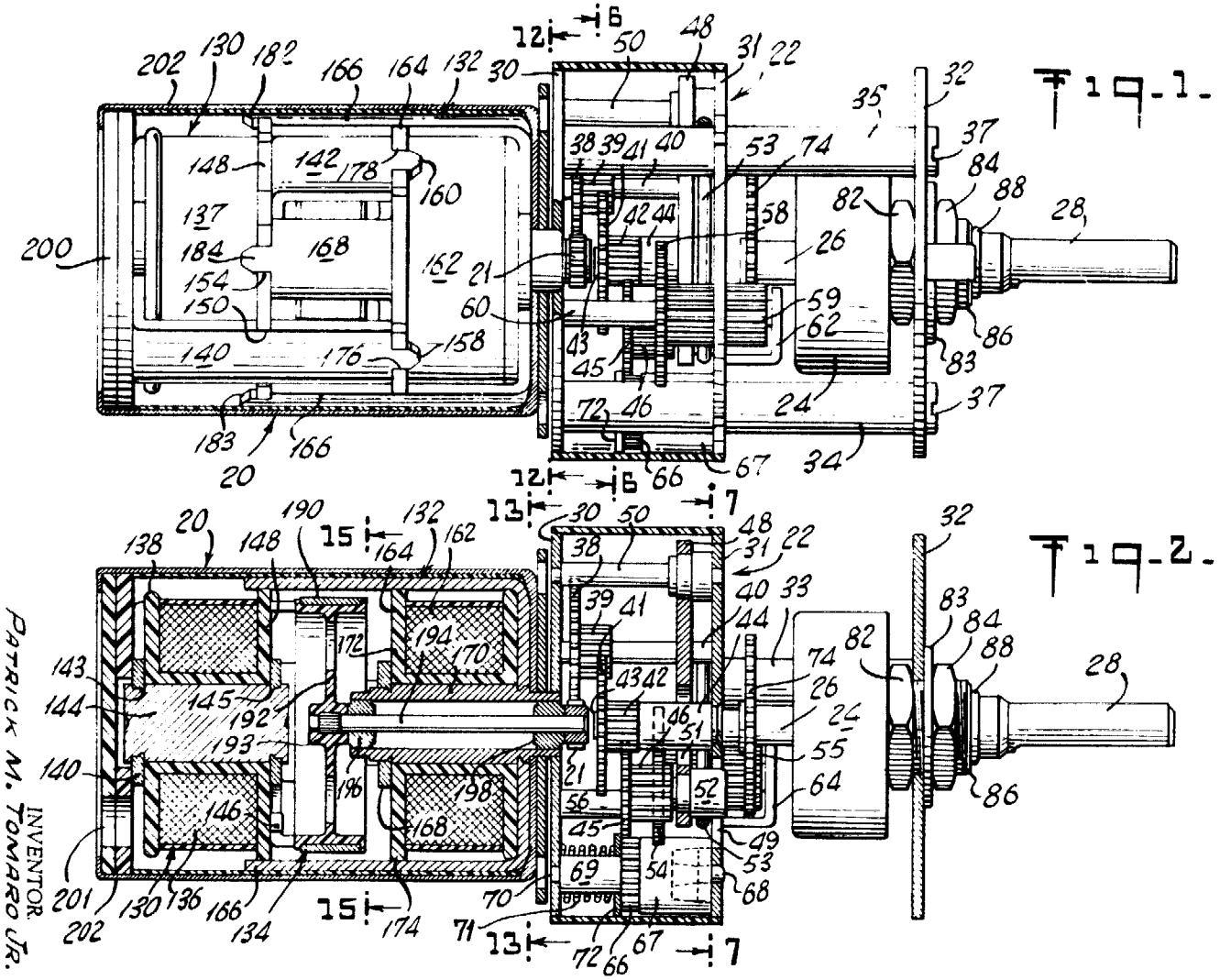
INVENTOR.
PATRICK M. TOMARO JR.
BY
Nolte & Nolte
ATTORNEYS TORQUE ACTUATED REVERSIBLE GEAR REDUCTION ASSEMBLY
Original Filed June 22, 1962
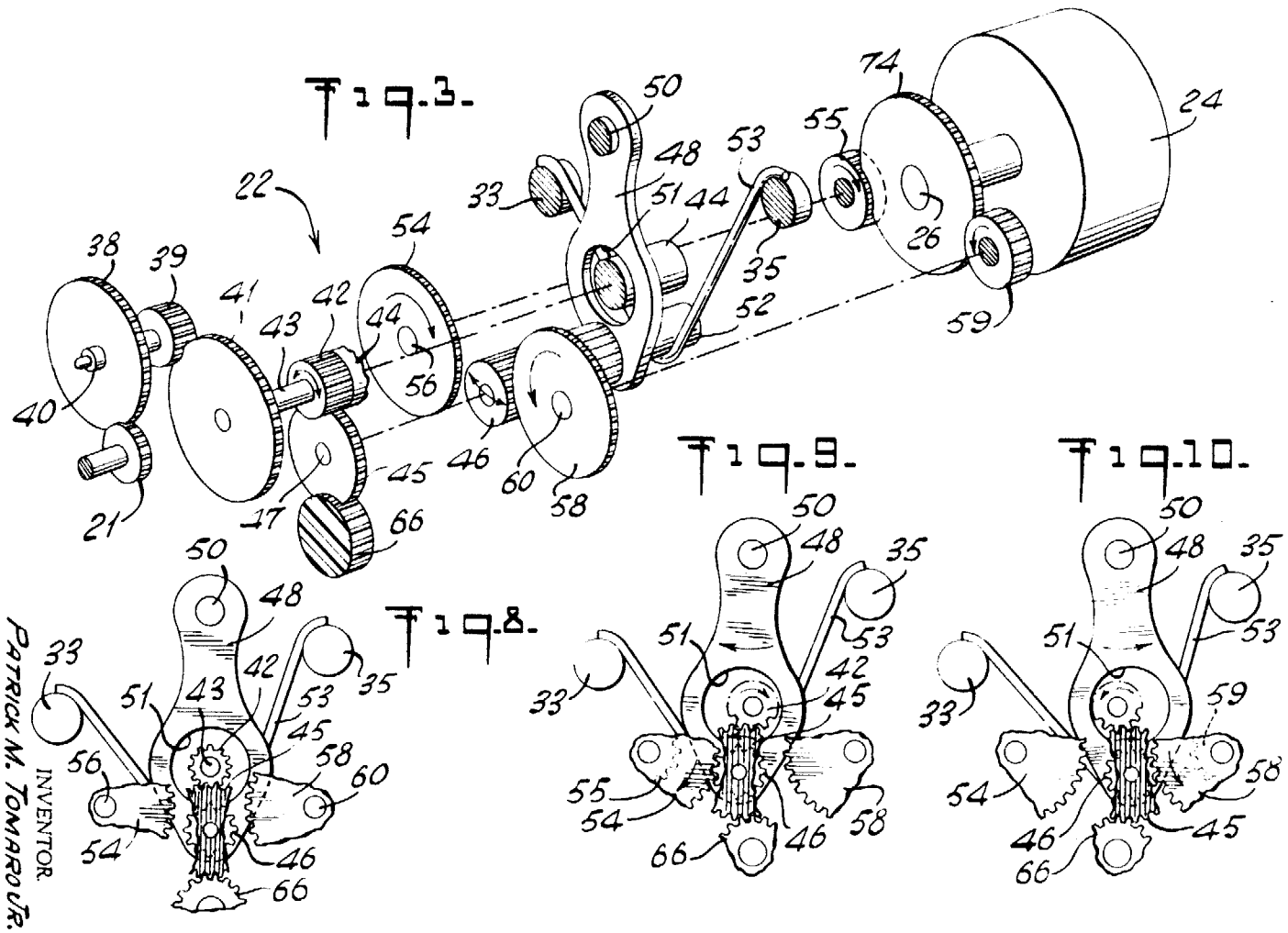
INVENTOR.
PATRICK M. TOMARO JR.
BY
Nolte & Nolte
ATTORNEYS

TORQUE AMPLIFIER REVERSIBLE GEAR REDUCTION ASSEMBLY

Original Filed June 20, 1962 Sheet 3 of 3

INVENTOR.
PATRICK M. TOMARO JR.

BY

Nolte & Nolte
ATTORNEYS

United States Patent Office

Re. 26,616
Reissued June 24, 1969

26,616
TORQUE ACTUATED REVERSIBLE GEAR REDUCTION ASSEMBLY

Patrick M. Tomaro, Jr., Maplewood, N.J., assignor, by mesne assignments, to Dale Electronics Inc., Columbus, Nebr., a corporation of Nebraska Original No. 3,241,385, dated Mar. 22, 1966, Ser. No. 204,460, June 22, 1962. Application for reissue Dec. 28. 1967, Ser. No. 706,997
Int. Cl. F16h *3/34, 5/52*
U.S. Cl. 74—354 9 Claims

Matter enclosed in heavy brackets [ ] appears in the original patent but forms no part of this reissue specification; matter printed in italics indicates the additions made by reissue.

*ABSTRACT OF THE DISCLOSURE*

*A simplified, miniaturized, motorized potentiometer in which the motor can be selectively disconnected from the assembly when manual rotation is desired. The motor is reversible and the gear train includes movable gears that are responsive to energization of the motor and are adapted to mesh with one of the two intermediate output gears depending upon the desired direction of rotation of the motor. Each of the intermediate gears are coupled to the output shaft and will cause the shaft to rotate in a different direction.*

This invention relates to motor and gear train assemblies. More particularly, this invention relates to a miniaturized motor and speed reduction gear assembly having particular utility as a means for rotatably positioning the shaft of a potentiometer or the like.

There are numerous applications wherein it is desirable to position a rotatable shaft by remote control. For example, in stereophonic systems it is necessary to properly balance the two audio channels with respect to the listener's position to achieve a proper stereophonic effect. The controls for the system are generally located away from this position and it is difficult to adjust the system at one location so that the sound is properly balanced at another location. Thus, it is desirable to have a simple remote control system wherein the controls may be located at any point with respect to the speakers, so that a listener, regardless of his location, can readily adjust a potentiometer to balance the two channels.

The prior art has suggested a number of different methods for achieving this objective. For instance, one method employs a small, synchronous motor in combination with the potentiometer and a gear reduction assembly to reduce the angular velocity of the rotor shaft to a level suitable for balancing the potentiometer. However, because of the huge inertia of the gear reduction system, which may reduce the speed by a factor of one hundred or more, in these systems it is practically impossible to manually adjust the potentiometer, which for various reasons might be desirable.

Accordingly, it is an object of this invention to provide a simplified motor and gear train assembly for positioning a rotatable shaft while permitting manual adjustment thereof.

Another object is to provide a miniaturized gear train assembly for use with a reversible motor wherein the outlet shaft is driven in accordance with the direction of the rotation of the motor.

Still another object is to provide a simplified gear train assembly wherein the output shaft is disconnected from the assembly when the input shaft is not rotated.

Yet another object is to provide a simplified means for remotely controlling a potentiometer or the like.

The objects of the invention are accomplished by coupling a reversible, synchronous motor and gear train assembly to the rotatable object to be positioned. The electrical controls for the motor are situated at the operator's location so that he can determine the direction and extent of rotation. The gear train assembly includes a movable gear which, in response to energization of the motor, is adapted to mesh with one of two intermediate output gears depending upon the direction of rotation of the motor. The movable gear is spring-biased to a center position where it meshes with neither intermediate gear when the motor is stationary. Both of the intermediate gears are coupled to an output shaft and each will cause the shaft to rotate in a different direction. When the motor is not operated and the movable gear is returned to its center position, the output shaft is effectively disconnected from the main body of the gear train assembly.

A more complete description of the manner in which the above objectives are accomplished will be given with reference to the following specification and drawings wherein:

FIG. 1 represents a side view of the motor and gear train assembly in conjunction with a potentiometer;

FIG. 2 is a cross-sectional view of the apparatus of FIG. 1;

FIG. 3 is an exploded perspective view of the gear train assembly;

FIGS. 8, 9 and 10 are cross-sectional views through the plane 6—6 of FIG. 1 illustrating the operation of the movable gear;

[FIG. 11 is an exploded view of the motor;

FIG. 11a illustrates the rotor structure of the motor;

FIG. 12 is a view through the plane 12—12 of FIG. 1;

FIG. 13 is a top view of one of the stator sections of the motor through the plane 13—13 of FIG. 2;

FIG. 14 is a bottom view of the other stator section of the motor;

FIG. 15 is a view along the line 15—15 of FIG. 2 showing the pole piece construction and rotor; and FIG. 16 is a schematic showing of the electrical circuit, motor, gear train and potentiometer.]

Figure 6:
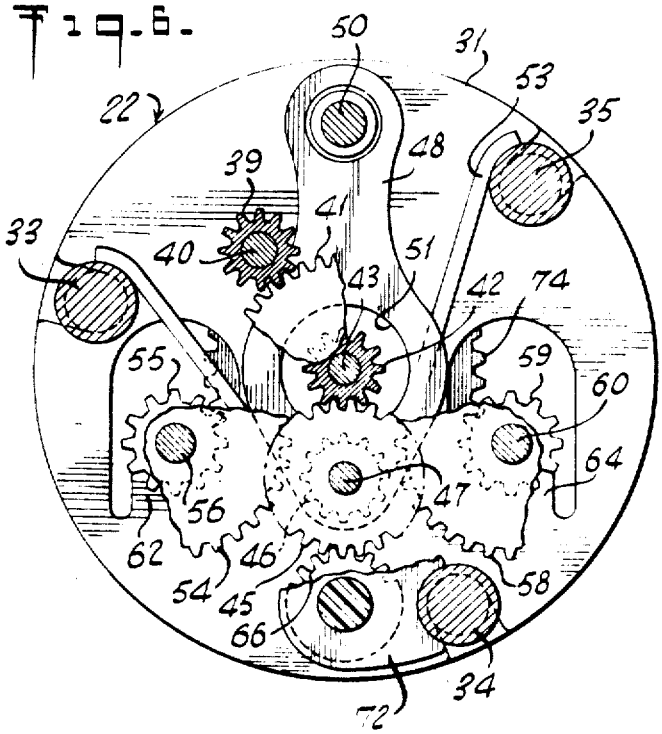
FIG. 6 is a view through the plane 6—6 of FIG. 1.

Referring now to FIGS. 1 and 2, the assembled unit is shown in combination with a potentiometer 24. The motor is indicated at 20 and includes an output gear 21 which is secured to the rotor. The motor is attached to a gear train assembly 22, which reduces the angular velocity of output 21 in order to adjust potentiometer 24. Gear assembly 22 includes an output shaft 26 which is adapted to rotate the movable contact of the potentiometer, and, in addition, the potentiometer may be controlled manually in a conventional manner by means of a shaft 28.

The operation and construction of motor 20 will be described in greater detail below. For purposes of explanation, it is sufficient to note at this point that the motor may be a reversible, synchronous motor. Depending upon the manner in which the coils of the motor are energized, the rotor, and thus the output gear 21, will rotate in a clockwise or counterclockwise direction. If the invention is to be used, for example, to adjust the balance of a stereophonic system, potentiometer 24 will be the balancing means and will be located in the preamplifier. The shaft 28 will extend from the preamplifier casing where it may be manually rotated to balance the system. The motor 20 and gear train assembly 22 will extend into the exterior of the casing. The leads controlling the motor may be connected to a small exterior unit including switch means for reversing the direction of rotation of the motor. The listener may then cause the movable contact of the potentiometer to rotate in either direction until the system is properly balanced. At that point, the coils of the motor are de-energized which, in accordance with the invention, automatically disengages the output shaft 26 of the potentiometer 24 from the gear train assembly 22, permitting manual adjustment of shaft 28. If the output shaft 26 were not disconnected from the gear assembly 22, it would be extremely difficult to manually adjust the potentiometer because of the inertia of the gear reduction necessary to reduce the relatively high speed of output gear 21 to the angular velocity necessary for adjustment purposes.

Figure 4:
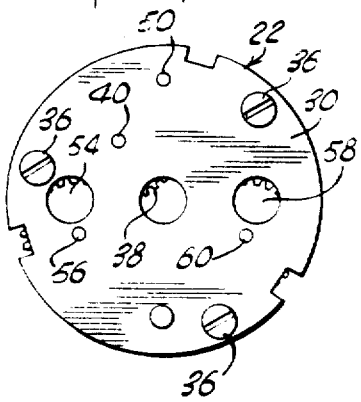
FIG. 4 is a top view of the gear train assembly.
Figure 7:
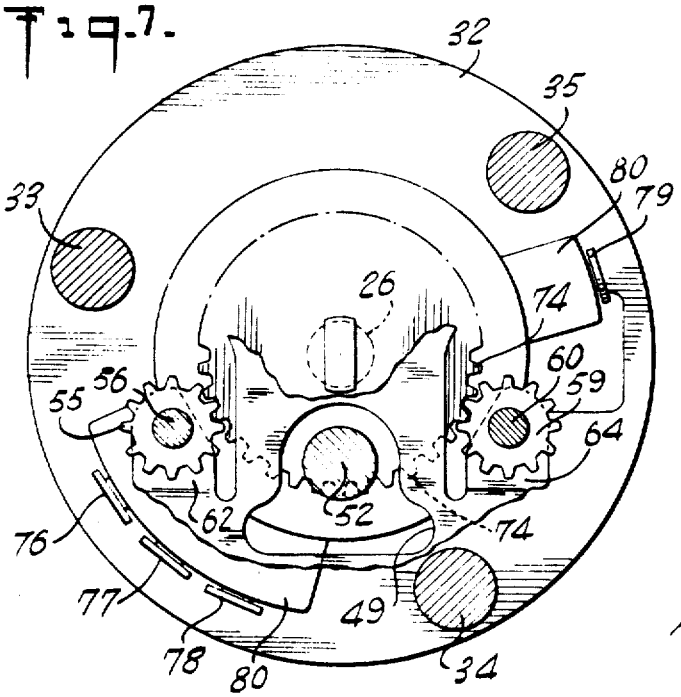
FIG. 7 is a cross-sectional view through the plane 7—7 of FIG. 2.
Figure 5:
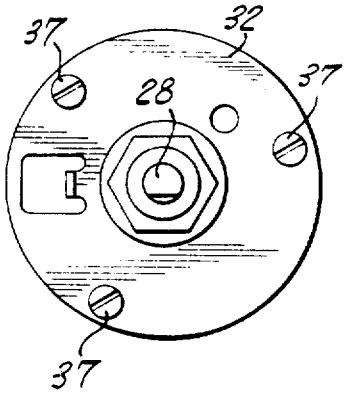
FIG. 5 illustrates the bottom plate of the gear train assembly.

The operation of the gear train assembly will be described in detail with additional reference to FIGS. 3–7. FIG. 3 is an exploded view of the gear train assembly. FIGS. 4 and 5 are top and bottom views of the assembly, respectively, while FIGS. 6 and 7 are views through the planes 6—6 and 7—7, respectively, of FIGS. 1 and 2. As shown most clearly in FIGS. 1–3, the output gear 21, attached to the rotor of the motor 20, extends into the gear train assembly 22. The assembly is supported by means of a top plate 30, a middle plate 31 and a bottom plate 32. The plates are fixed and held together by horizontal supporting posts 33, 34 and 35, spaced about the periphery of the assembly. Upper screws 36 (FIG. 4) and lower screws 37 extend into the posts to secure the assembly together. Middle plate 31 may be secured by means of small cut-out portions which are received in suitable grooves of the supporting posts.

The output gear 21 extends through the top plate 30 and into engagement with a pair of offset coaxial gears 38 and 39. Gear 21 engages the larger diameter gear 38 which along with gear 39 is secured to a pin 40 journaled in top plate 30 and middle plate 31. Gear 39 engages a large diameter gear 41 which is coaxial with a smaller gear 42. Gears 41 and 42 are secured to a pin 43 which is rotatably supported in a stationary post 44 extending from the center of middle plate 31 toward the inner plate 30.

In accordance with the invention, a pair of movable coaxial gears 45 and 46 are secured to a pin 47 which is journaled in a pivotable yoke 48. Yoke 48 is mounted between inner plate 30 and middle plate 31 by means of a post 50 which is pivotally supported in these two plates at a point toward the periphery of the gear train assembly between supporting posts 33 and 35. Yoke 48 includes an aperture 51 which straddles the stationary post 44 on which the pair of central coaxial gears 41 and 42 are supported. As illustrated, yoke 48 is secured to post 50 at a slight distance above the upper surface of middle plate 31. Mounted on yoke 48 beneath coaxial gears 45 and 46, a small downwardly extending post 52 extends into an opening 49 (FIG. 7) provided in plate 31. A V-shaped spring 53 is situated between the middle plate 31 and yoke 48 with its apex passing around the outside of post 52 and the extremities of its arms braced against supporting posts 33 and 35, as shown in FIGS. 3 and 7. If desired, the spring may be wound around post 52 or any other spring configuration may be employed within the spirit of the invention.

Spring 53 is adjusted to position yoke 48 so that gear 46 is centered between and out of engagement with two pairs of intermediate coaxial output gears 54, 55 and 58, 59, respectively. Gears 54 and 55 are secured to a pin 56, and gears 58 and 59 are secured to a pin 60. Middle plate 31 has a pair of integrally formed L-shaped arms 62 and 64 extending dowinwardly towards outer plate 32 as shown in FIGS. 1 and 2. Pin 56 is journaled in arm 62 and middle plate 31, and pin 60 is journaled in arm 64 and plate 31 to permit rotation of whichever intermediate gear is engaged by the movable gear 46, as will be described below. The small diameter gears 55 and 59 of the intermediate coaxial gears are in permanent engagement with an output gear 74 secured to output shaft 26, and since each intermediate pair of gears is caused to rotate in a different direction, the direction of rotation of shaft 26 is determined by which pair of gears is engaged by movable gear 46.

The movement of gear 46 into engagement with one of the pairs of intermediate coaxial gears is enabled by means of a clutch pinion 66 which is best illustrated in FIG. 2. Pinion 66 engages the large diameter movable gear 45. The pinion may be made of a non-metallic material and includes a hollow cylindrical base portion 67 extending toward middle plate 31. The clutch pinion 66 is rotatably supported in plates 31 and 30 by means of a downwardly extending pin 68 and an upwardly extending pin 70 concentric with base portion 67.

A clutch pinion spring 71, surrounding post 69, is tensioned between top plate 30 and a clutch pinion washer 72 (FIG. 6) which rests above pinion 66 and helps maintain the pinion in engagement with gear 45. Thus, although the clutch pinion 66 is capable of rotation, the force of spring 71 causes friction between middle plate 31 and the bottom of the cylindrical base 67 which tends to inhibit the rotation of pinion 66.

The operation of the gear train assembly will now be described in greater detail with specific reference to FIGURES 8, 9 and 10, which are cross-sectional views through the plane 6—6 of FIG. 1. These figures illustrate the manner in which the rotation of the yoke enables gear 46 to drive one of the two intermediate coaxial gears. It will be recalled that under normal conditions, the movable gear 46 is biased by spring 53 to a position between intermediate gears 54 and 58 where it is in engagement with neither gear. Under these conditions, the output gear 74, and thus the potentiometer 24, is effectively disconnected from the gear train assembly. Depending upon the direction of rotation of the output gear 21 of motor 20, it is necessary to engage one of the two pairs of intermediate coaxial gears. Thus, assume gear 21 is rotating in a clockwise direction. Coaxial gears 38 and 39 which are connected therewith, rotate in a counterclockwise direction, while coaxial gears 41 and 42 which are in engagement with gear 39 rotate in a clockwise direction. Movable gears 45 and 46 which are in engagement with gear 42 also rotate in a counterclockwise direction. Since intermediate gears 54 and 58 are in engagement with none of the above-mentioned gears, neither gear immediately responds to the rotation of the output gear 21. However, since clutch pinion 66 is friction biased against middle plate 31 by the action of spring 71, the pinion tends to resist rotation causing the entire movable gear 45 to tend to move in a counterclockwise direction around the friction pinion 66. Gear 47 and gear 46 are mounted on a yoke 48 which is capable of a pivotable movement about pivot post 50, and therefore coaxial gears 45 and 46 move to the position shown in FIG. 9 where the small diameter gear 46 engages the large diameter gear 54. Since gear 46 is secured to gear 45, which in turn engages small central gear 42, intermediate gear 54 will rotate in a clockwise direction causing gear 55, which meshes with output gear 74, to rotate output shaft 26 in a counterclockwise direction at a greatly reduced speed. The movement of the yoke is limited by engagement of gear 46 with intermediate gear 54, and when the frictional forces between the clutch pinion 66 and the middle plate 31 are overcome, the pinion will be forced to rotate also. As the yoke 48 pivots from its center position illustrated in FIG. 8, it acts against the biasing force of spring 53, so that even when gear 46 engages intermediate gear 54 it is being urged to its center position.

When the movable contact of potentiometer 24 has been rotated to a desired position, the operator may throw a switch to halt operation of the motor. As soon as gear 21 stops rotating, the force that is holding gear 46 in engagement with intermediate gear 54 is removed, and the centering spring 53 returns the yoke 48 to its initial position indicated in FIG. 8. During the return movement, pinion 66 remains fixed, and movable gears 46 and 45 drive the front end of the gear train and motor in reverse as yoke 48 pivots back to its neutral position under the influence of springs 53. As above-discussed, at this point the movable gear 46 is centered between the two pairs of intermediate coaxial gears effectively disconnecting the output shaft 26 from the main body of the gear train assembly. In this state, it is relatively easy to manually adjust the potentiometer by means of shaft 28, since it is only necessary to push against the intermediate output gears which are in engagement with output gear 74.

If the operator thereafter causes the motor to rotate in the reverse direction so that gear 21 is turning in a counterclockwise direction, the action is similar to that described above. In this case, however, as shown in FIG. 10, the movable gears 45 and 46 rotate with yoke 48 in a countreclockwise direction about pivot post 50, causing gear 46 to move into engagement with intermediate output gear 58. When the energization is removed from the coils of the motor and gear 21 stops rotating, centering spring 53 returns the yoke to its center position illustrated in FIG. 8, disengaging gear 47 form either intermediate output gear 58 or 54.

Potentiometer 24 includes terminals 76, 77, 78 and 79 supported on an insulation board 80 in a conventional manner as illustrated in FIG. 7. The potentiometer is mounted on the inner surface of bottom plate 32 and includes a threaded sleeve 86 which extends through plate 32 and is secured thereto by means of an inner nut 82, an external washer 83, and an external nut 84. A C-clip 88 retains the shaft 28 in its proper position within sleeve 86.

Motor 20 is a synchronous motor of the hysteresis type. Such motors are economical to manufacture, so that despite their relatively low efficiency they are particularly suitable for the present purposes in view of the light load which might be driven. Because of improved techniques, these motors have found increasing favor wherein a small synchronous motor must be used to drive relatively light loads, such as a clock, potentiometer or the like.

Although a specific embodiment of the invention has been disclosed, many modifications thereof will be obvious to one skilled in the art, and the invention should not be limited except as defined in the following claims.

I claim:

1. A gear reduction assembly for coupling the driving shaft of a reversible motor to a single output shaft whereby said output shaft may be driven by said motor, said assembly comprising an input gear operatively coupled to the drive shaft and rotatable in response to the rotation of said driving shaft, an output gear coupled to said output shaft, a pair of intermediate gears in engagement with said output gear and means for decoupling said driving and output shafts at times when said motor is not running whereby to facilitate manual control of said output shaft at such times, said means comprising a pair of coaxial movable gears having different diameters, a subframe for mounting said coaxial gears, said frame being pivotably mounted on an axis remote from the axis of the input gear for providing transverse movement thereof, the first of said coaxial movable gears being in engagement with said input gear whereby said coaxial movable gears can traverse a portion of the circumference of said input gear, a pinion supported within said assembly and frictionally biased against rotation, said pinion being coupled to the first of said coaxial movable gears to permit said coaxial movable gears to traverse said input gear responsive to the rotation of said driving shaft whereby the second of said coaxial movable gears is moved into engagement with one of said intermediate gears depending upon the direction in which said driving shaft is rotating, and spring means biased by the movement of said coaxial movable gears for moving said second coaxial gear out of engagement with either of said intermediate gears when said motor is not running.

2. The combination of a motor and gear assembly, said motor including a bi-directional motor having a single output drive shaft, said gear assembly including an input gear operatively coupled to the drive shaft and rotatable in response to the rotation of said driving shaft, an output gear coupled to said output shaft, a pair of intermediate gears in engagement with said output gear, and means for decoupling said driving and output shafts at times when said motor is not running whereby to facilitate manual control of said output shaft at such times, said means comprising a pair of coaxial movable gears having different diameters, a subframe for mounting said coaxial gears, said frame being pivotably mounted on an axis remote from the axis of the input gear for providing transverse movement thereof, the first of said coaxial movable gears being in engagement with said input gear whereby said coaxial movable gears can traverse a portion of the circumference of said input gear, a pinion supported within said assembly and frictionally biased against rotation, said pinion being coupled to the first of said coaxial movable gears to thereby permit said coaxial movable gears to traverse said input gear responsive to the rotation of said driving shaft whereby the other of said coaxial movable gears is moved into engagement with one of said intermediate gears depending upon the direction in which said driving shaft is rotating, and spring means biased by the movement of said coaxial movable gears for moving said other coaxial gear out of engagement with either of said intermediate gears when said motor is not running.

3. A gear reduction assembly according to claim 1 wherein said intermediate gears each comprises a pair of coaxial gears, one of said intermediate coaxial gears being in engagement with said output gear and the other of said intermediate coaxial gears being adapted to engage said other movable coaxial gear.

*4. An assembly for selectively controlling a potentiometer manually or by a motor, said assembly comprising a potentiometer having a rotatable output shaft for adjusting said potentiometer and a rotatable control shaft for manually adjusting said potentiometer; a motor having a drive shaft; and gear means coupling the drive shaft of said motor with the output shaft of said potentiometer for adjusting said potentiometer under control of said motor during energization of said motor in a manner whereby upon deenergization of said motor said gear means decouples said output shaft from the drive shaft of said motor thereby permitting adjustment of said potentiometer under manual control via said control shaft, said gear means including a pair of coaxial movable gears of different diameters, a movable subframe upon which said coaxial movable gears are mounted, at least one of said coaxial gears being selectively operatively connected to one of the other gears of said gear means for coupling the drive shaft of said motor with the output shaft of said potentiometer when said motor is operative, but disconnected from said one other gear when said motor is inoperative.*

*5. An assembly for selectively controlling a potentiometer manually or by means of a motor, said assembly comprising a potentiometer having a rotatable output shaft for adjusting said potentiometer; said motor being provided with a drive shaft; and gear means coupling said drive shaft of said motor with the output shaft of said potentiometer for adjusting said potentiometer under control of said motor during energization of said motor in a manner whereby upon deenergization of said motor*

*said gear means decouples said output shaft from the drive shaft of said motor thereby permitting adjustment of said potentiometer under manual control through said control shaft, said gear means comprising an input gear operatively coupled to the drive shaft of said motor and rotatable in response to rotation of said drive shaft, an output gear coupled to the output shaft of said potentiometer, a pair of intermediate gears in engagement with said output gear, and means for decoupling said drive and output shafts at times when said motor is deenergized, said means comprising a pair of co-axial movable gears having different diameters, a subframe for mounting said coaxial gears, said subframe being pivotally mounted on an axis remote from the axis of the first of said coaxial movable gears being in engagement with said input gear whereby said coaxial movable gears can traverse a portion of the circumference of said input gear, a pinion supported within said gear means and frictionally biased against rotation, said pinion being coupled to the first of said coaxial movable gears to permit said coaxial movable gears to traverse said input gear responsive to the rotation of said drive shaft whereby the second of said coaxial movable gears is moved into engagement with one of said intermediate gears depending upon the direction in which said drive shaft is rotating, and spring means biased by the movement of said coaxial movable gears for moving said second coaxial gear out of engagement with either of said intermediate gears when said motor is deenergized.*

*6. An assembly as claimed in claim 5, wherein said intermediate gears each comprises a pair of coaxial gears, one of intermediate coaxial gears being in engagement with said output gear and the other of said intermediate coaxial gears being adapted to engage said other movable coaxial gear.*

*7. An assembly for selectively controlling a potentiometer manually or by means of a motor, said assembly comprising a potentiometer having a rotatable output shaft for adjusting said potentiometer; said motor being provided with a drive shaft; and gear means coupling said drive shaft of said motor with the output shaft of said potentiometer for adjusting said potentiometer under control of said motor during energization of said motor said gear means decouples said output shaft from the drive shaft of said motor thereby permitting adjustment of said potentiometer under manual control through said control shaft, said gear means comprising an input gear operatively coupled to the drive shaft of said motor and rotatable in response to rotation of said drive shaft, and output gear coupled to the output shaft of said potentiometer, a pair of intermediate gears in engagement with said output gear, and means for decoupling said drive and output shafts at times when said motor is deenergizing, said means comprising a pair of co-axial movable gears having different diameters, a subframe for mounting said co-axial gears, said subframe being pivotally mounted on an axis remote from the axis of the first of said co-axial movable gears being in engagement with said input gear whereby said co-axial movable gears can traverse a portion of the circumference of said input gear, a pinion supported within said gear means and frictionally biased against rotation, said pinion being coupled to the first of said co-axial movable gears to permit said co-axial movable gears to traverse said input gear responsive to the rotation of said drive shaft whereby the second of said co-axial movable gears is moved into engagement with one of said intermediate gears depending upon the direction in which said drive shaft is rotating, and spring means biased by the movement of said co-axial movable gears for moving said second co-axial gear out of engagement with either of said intermediate gears when said motor is deenergized; an input gear operatively coupled to the drive shaft of said motor and rotatable in response to rotation of said drive shaft, an output gear coupled to the output shaft of said potentiometer, a pair of intermediate gears in engagement with said output gear, and means for decoupling said drive and output shafts at times when said motor is deenergized, said means comprising a pair of co-axial movable gears having different diameters, a subframe for mounting said co-axial gears, said subframe being pivotally mounted on an axis remote from the axis of the input gear for providing transverse movement thereof, the first of said co-axial movable gears being in engagement with said input gear whereby said co-axial movable gears can traverse a portion of the circumference of said input gear, a pinion supported within said gear means and frictionally biased against rotation, said pinion being coupled to the first of said co-axial movable gears to thereby permit said co-axial movable gears to traverse said input gear responsive to the rotation of said drive shaft whereby the other of said co-axial movable gears is moved into engagement with one of said intermediate gears depending upon the direction in which said drive shaft is rotating, and spring means biased by the movement of said co-axial movable gears for moving said other co-axial gear out of engagement with either of said intermediate gears when said motor is deenergized.*

*8. An assembly for selectively controlling a potentiometer manually or by motor, said assembly comprising a potentiometer having a rotatable output shaft for adjusting said potentiometer and a rotatable control shaft for manually adjusting said potentiometer, a motor having a drive shaft, gear means coupling said drive shaft of said motor with the said output shaft of the potentiometer for adjusting said potentiometer under control of said motor during energization of said motor in a manner whereby upon deenergization of said motor said gear means decouples said output shaft from the drive shaft of said motor thereby permitting adjustment of said potentiometer under manual control through said control shaft, said gear means comprising an input gear operatively coupled to the drive shaft of said motor and rotatable in response to rotation of said drive shaft, an output gear coupled to the output shaft of said potentiometer, a pair of intermediate gears operatively connected with said output gear, and means for coupling and decoupling said drive and output shafts, said means comprising a pair of co-axial movable gears having different diameters, a subframe for mounting said co-axial gears, said subframe being pivotally mounted on an axis remote from the axis of said co-axial gears, one of said co-axial gears being operatively coupled to said input gear whereby said input gear responsive to the rotation of said drive shaft and the action of at least one of the other gear means causes said subframe to pivot and the other co-axial gear to drivingly engage a selected intermediate gear depending upon the direction in which said drive shaft is rotating and thereby couple said drive and output shafts, and spring means previously biased by the pivotal movement of said subframe for moving said other co-axial gear out of engagement with said selected intermediate gear at times when said motor is deenergized.*

*9. The combination as claimed in claim 8 wherein said subframe is provided with said co-axial gears at an end thereof remote from the pivotal mounting of said subframe, and said intermediate gears being located adjacent to and on opposite sides of said co-axial gears whereby pivotal movement of said subframe in one direction causes said other co-axial gear to engage one of said intermediate gears and the pivotal movement of said subframe in an opposite direction causes said other co-axial gear to engage the other of said intermediate gears.*

References Cited

The following references, cited by the Examiner, are of record in the patented file of this patent or the original patent.

UNITED STATES PATENTS 1,380,874 6/1921 Valent ---------- 74—354

(Other references on following page)

UNITED STATES PATENTS

| | | | |
|---|---|---|---|
| 1,841,950 | 1/1932 | Hinman | 74—405 X |
| 2,046,412 | 7/1936 | Reynolds | 74—354 |
| 2,094,669 | 10/1937 | Pratt | 74—353 X |
| 2,506,562 | 5/1950 | Wait | 74—812 X |
| 2,587,038 | 2/1952 | Goodell | 74—354 X |
| 2,828,648 | 4/1958 | Hazard | 74—354 X |
| 2,896,873 | 7/1959 | Mageoch | 74—354 X |
| 2,972,900 | 2/1961 | Bailey et al. | 74—354 |
| 2,978,923 | 4/1961 | Carlson | 74—354 X |
| 3,028,767 | 4/1962 | Moore | 74—354 X |

| | | | |
|---|---|---|---|
| 3,040,599 | 6/1962 | Carlson | 74—354 |
| 3,168,840 | 2/1965 | Williams | 74—354 |
| 3,212,355 | 10/1965 | Visin | 74—625 |

FOREIGN PATENTS

| | | |
|---|---|---|
| 789,165 | 1/1958 | Great Britain. |

DONLEY J. STOCKING, *Primary Examiner.*

T. C. PERRY, *Assistant Examiner.*

U.S. Cl. X.R.

74—10.8, 810, 849